United States Patent [19]

Mas et al.

[11] 4,252,650
[45] Feb. 24, 1981

[54] WATER PURIFYING DEVICE

[76] Inventors: Jaime Mas, 7950 SW. 17 Ter., Miami, Fla. 33155; Hernando Vargas, 4550 NW. 9 St., #802, Miami, Fla. 33126

[21] Appl. No.: 115,767
[22] Filed: Jan. 25, 1980
[51] Int. Cl.³ ............................................. B01D 35/00
[52] U.S. Cl. ........................................ 210/86; 210/98; 210/128
[58] Field of Search .................................... 210/85-87, 210/93, 97, 98, 110, 113, 128, 143, 148, 257.1, 258, 282

[56] References Cited
U.S. PATENT DOCUMENTS

| | | | |
|---|---|---|---|
| 1,315,662 | 9/1919 | Gouchenour | 210/113 |
| 1,708,235 | 4/1929 | Nugent | 210/86 |
| 1,870,321 | 8/1932 | Adelson | 210/87 |
| 3,334,044 | 8/1967 | Satterlee | 210/97 |

Primary Examiner—Ivars C. Cintins
Attorney, Agent, or Firm—John Cyril . Malloy

[57] ABSTRACT

A portable water purifying device is disclosed which includes a main housing provided with a main inner chamber to receive a purified water receptacle. An electric circuit provides a main "on-off" switch to provide a flow of water in its "on" position, from a suitable pressurized source through a purifying capsule into a suitable container such as a jug. When the container is full a limit switch shuts off the water flow and a signal light is illuminated. The container is removed and replaced with another empty container. In preferred form of the invention, a refill switch is provided to deenergize the signal light and to initiate another water purifying and container filling cycle.

11 Claims, 7 Drawing Figures

4,252,650

WATER PURIFYING DEVICE

BACKGROUND OF THE PRESENT INVENTION

The present invention pertains to a water purifying device, and more particularly to a device of this nature which is portable and is particularly intended for use in homes and places of business, for example, or anywhere where it is desirable to have a fresh supply of purified water at an insignificant cost.

OBJECTS OF THE PRESENT INVENTION

One of the principal objects of the present invention is to provide a fully automatic portable water purifier device which receives water from a convenient source, purifies the water and discharges it into a convenient container such as a five-gallon jug in a larger form of the invention, or a one-gallon jug, in a smaller form thereof.

A further object of the invention is to provide a water purifier which includes a manually operated electric switch means to initiate operation of the device and a limit switch to respond to a slight overflow of the container to stop the flow of water thereinto.

Yet another object of the invention is to provide a signal light to indicate a full condition of the container.

Another object of the invention is to provide a second manually operated switch to operate a pump to discharge the overflow water outwardly through a discharge conduit.

DETAILED DESCRIPTION OF THE DRAWINGS

Figure 1:
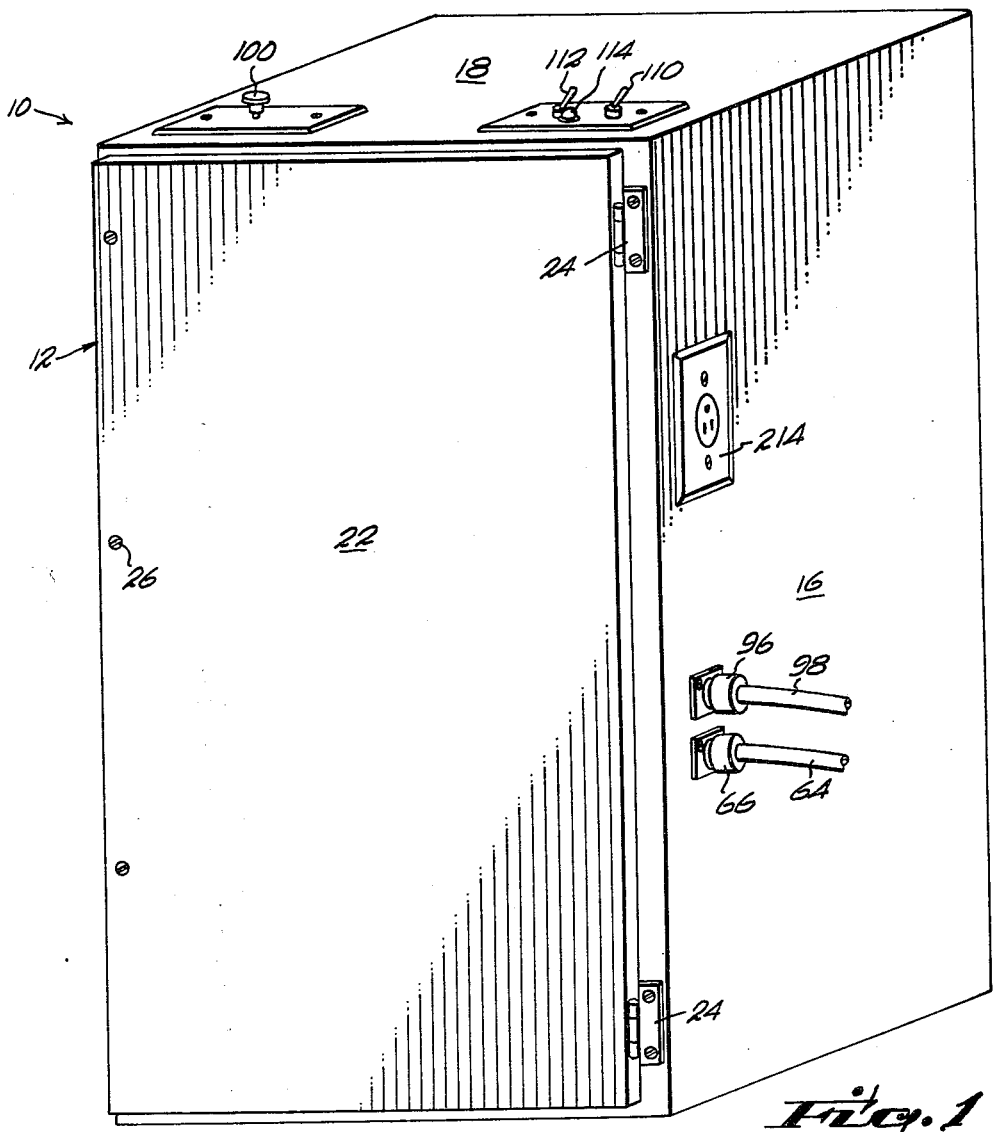
FIG. 1 is a front perspective view of a preferred form of the portable water purifier of the present invention.
Figure 2:
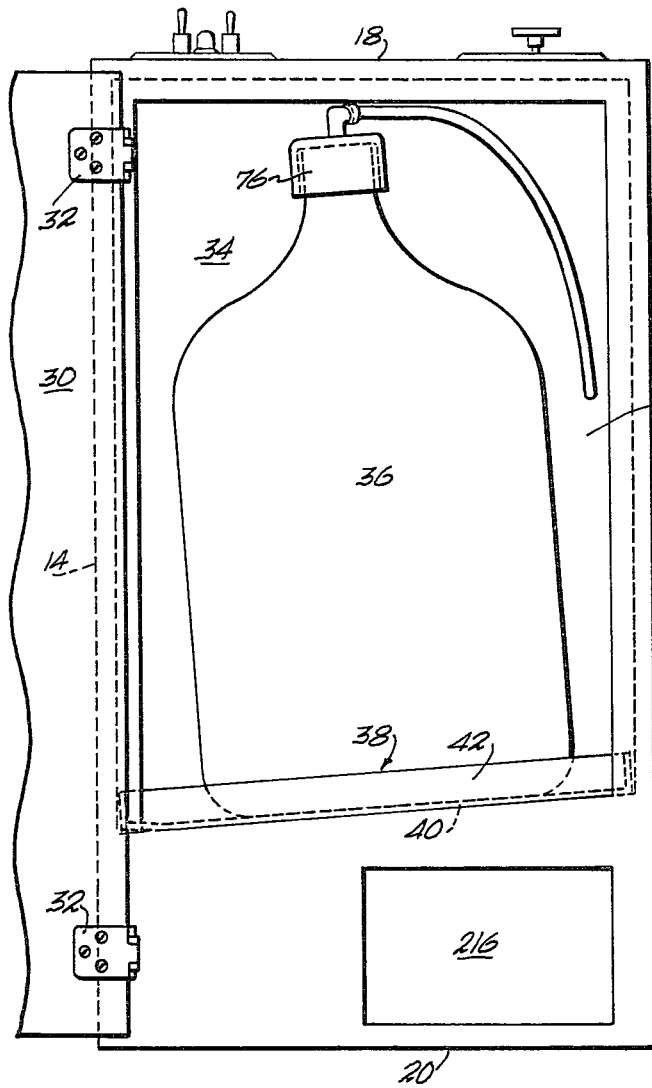
FIG. 2 is a back elevational view of FIG. 1.

With reference to the drawings and particularly to FIGS. 1 and 2, the water purifying device, designated generally at 10 includes a cabinet 12 including a pair of side walls 14, 16 and top and bottom walls 18 and 20. A full length front service door 22 is hinged at 24 to a side wall such as 16, door 22 preferably includes secure attachment means such as screws 26 to deter unauthorized entry into the front of the interior chamber 28 which houses various electrical components and other functional devices of the water purifier, to be subsequently described. It will be obvious that other securing devices such as a lock may be employed.

As illustrated in FIG. 2, a back door 30 hinged at 32 to side wall 14 opens into an interior chamber 34 which houses a receptacle such as a jug 36 which may be of the five-gallon variety, commonly used for purified water or the device may be designed to receive a one-gallon jug, or, in fact, any practical size of available receptacle.

Figure 4:
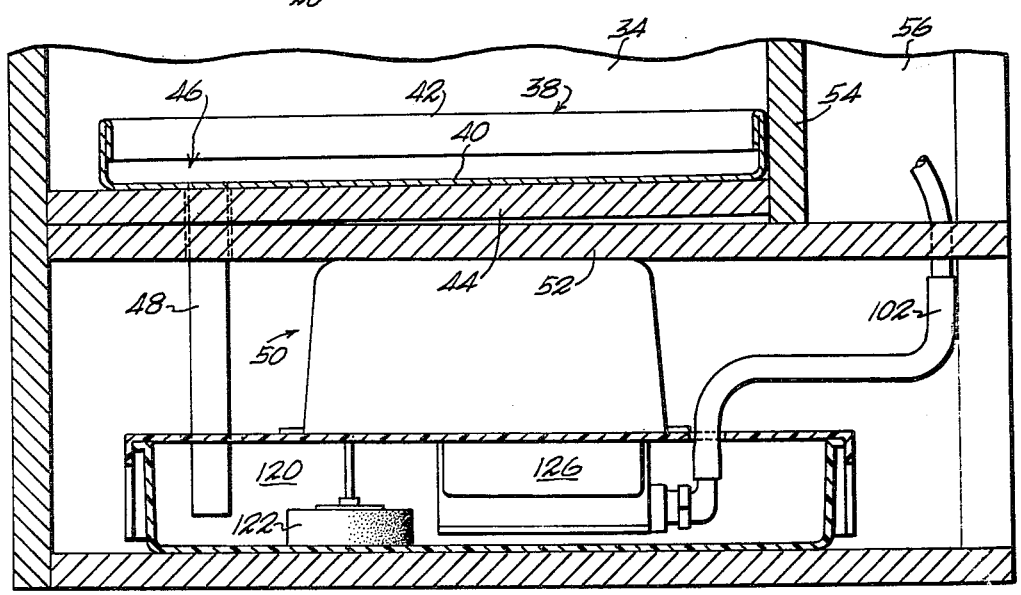
FIG. 4 is a fragmentary sectional view taken along lie 4—4 of FIG. 3, illustrating a first form of limit switch means to stop the flow of water into the container.

As best illustrated in FIGS. 2 and 4, the jug 36 is disposed in a tray 38 comprised of a bottom 40 with surrounding upstanding side walls 42. Tray 38 is seated on a floor member 44 fixed in a closing relation to the bottom of chamber 34. Floor member 44 is angularly disposed to position one corner 46 of tray 38 below the level of the balance of the tray causing water overflowing from jug 36 to flow out through an overflow drain tube 48 disposed in the low corner 46. The water from tube 48 enteres a shut-off switch device 50 to be subsequently described.

Angular floor member 44 is fixed atop a horizontally disposed divider 52 and a vertical divider 54 defines the jug chamber 34 and a front vertical chamber 56 housing the various electrical components, water conduits and filter cartridge now to be described.

Figure 3:
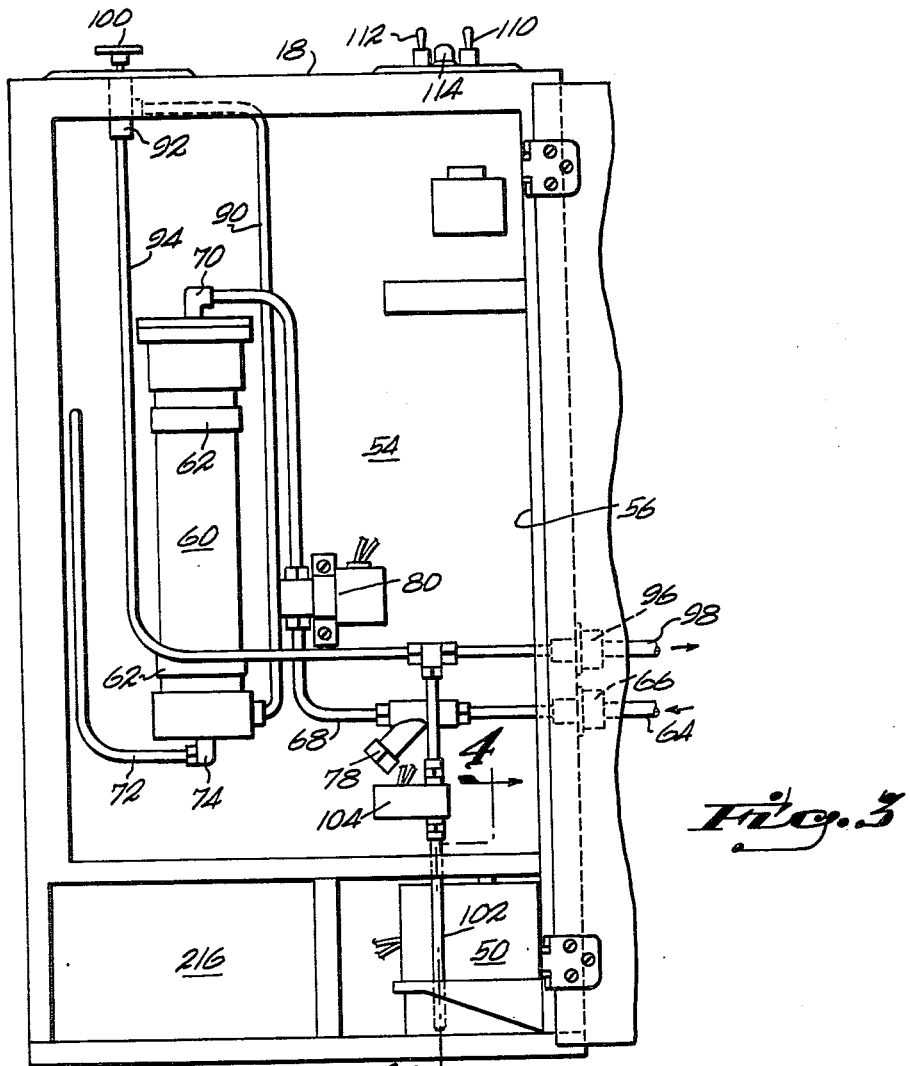
FIG. 3 is a front elevational view of FIG. 1 with the front door thereof in an open position.

With reference to FIG. 3, a commercially available type of water filter cartridge 60 is fixed to vertical divider 54, within chamber 56, in any convenient manner, such as by the pair of bands 62. A water supply conduit 64, from a suitable pressurized source, connects at 66 to a conduit 68 in chamber 56. Conduit 68 connects at 70 to the top end of filter cartridge 60. A conduit 72, connected at 74 to the bottom of cartridge 60, extends through divider wall 54 and is in open communication with the interior of a cap 76, FIG. 2, sized to loosely engage over the opening into jug 36. A strainer fitting 78 and a solenoid valve 80 are interposed in conduit 68. The strainer simply removes any solids from the water prior to entering the filter 60 and the function of solenoid valve 80 will be subsequently described relative to FIG. 5.

A conduit 90 connects from the bottom of filter cartridge 60 to a drain valve 92 mounted in top wall 18, and a conduit 94 connects at 96 from drain valve 92 to a main drain 98. Drain valve 92 is manully operated to an open position by knob 100. In use, the drain valve 92 is manually opened briefly, one minute each week, for example, with the device in operation, to maintain the purifier at optimum efficiency by expelling water impurities through drain 98.

With further reference to FIG. 3, a conduit 102 connects with drain conduit 94 and opens into the shut-off switch device 50. A solenoid valve 104 is interposed in conduit 102 for a purpose hereinafter described.

A main on-off switch 110, a refill switch 112 and a signal light 114 are disposed in top wall 18.

The switch device 50 is disclosed in FIG. 4. This device is a commercially available product and functions in the following manner to shut off the flow of water. As previously described, the jug cap 76 loosely fits jug 36. Therefore, the jub filling operation terminates when a predetermined amount of water overflows past the loose cap 76 into tray 38 and through drain 48 into a chamber 120 of switch device 50. Float 122 rises on the water and closes a switch 124, FIG. 5, which stops the flow of water, a motor driven pump 126 exhausts the water in chamber 120 through conduit 102 and main drain 98.

Figure 5:
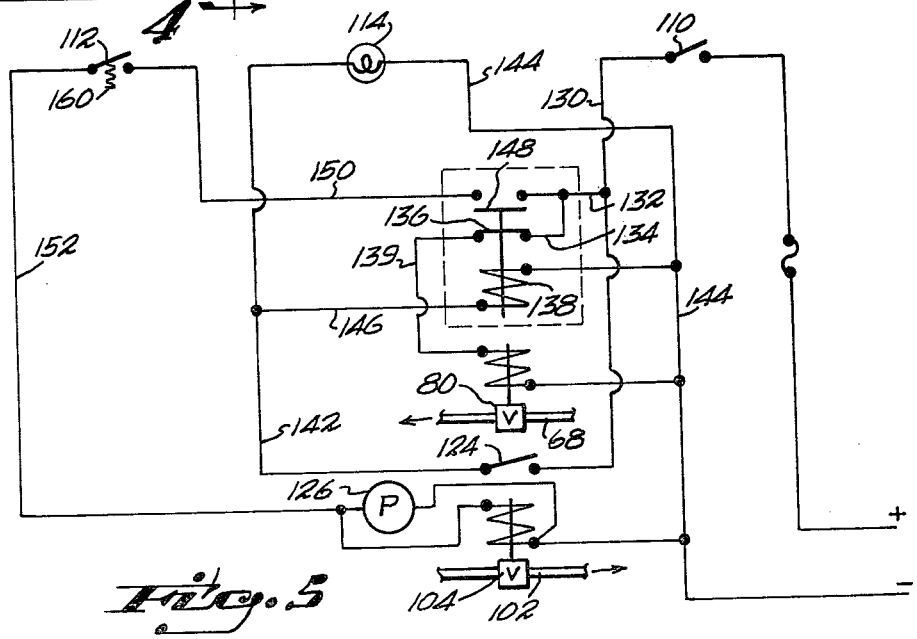
FIG. 5 is an electrical schematic of a first preferred form of the device.

The following is a complete description of the operation of the device as related to FIG. 5. With a jug 36, with its cap 76 in place and disposed on the tray 38, the main switch 110 is closed to complete a circuit through leads 130, 132 and 134 to the normally closed switch position 136 of relay 138. A circuit is thereby completed through a lead 139 and solenoid valve 80 to cause water from a suitable pressurized source to flow into jug 36 through filter cartridge 60 via conduits 64, 68 and 72.

When the jug overflows a predetermined amount, the float 122 rises and closes switch 124. A circuit is completed through leads 130, 142 and 144 and closed switch 124 to energize the signal light 114. Simultaneously relay 138 is energized through lead 142, 146 and 144 to open switch 136 to stop the flow of water through the cartridge of the jug 36. The after, refill switch 112 is closed to complete a circuit through lead 130, closed switch 148, and leads 150 and 152 to open solenoid valve 104 and to energize pump 126 to exhaust the water in chamber 120 through conduits 102 and 93. Switch 112 is held closed against the pressure of spring 160 until the float 122 drops, opening switch 124, the light 114 goes out and the device will immediately begin to fill the replacement jug with purified water unless the main switch 110 is turned off when the light 114 goes out. Obviously, a jug may be partially filled to any desired degree by turning the main switch off when a desired amount of water is in the jug.

Figure 6:
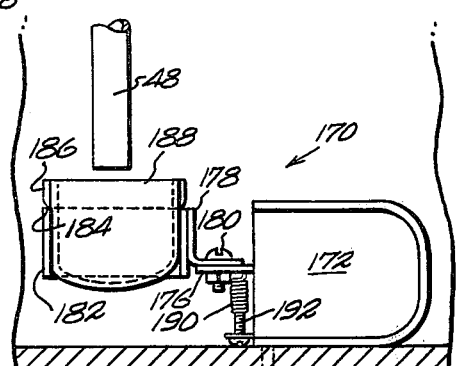
FIG. 6 is a fragmentary sectional view illustrating a second form of limit switch means.

FIG. 6 illustrates a modified form of water shut-off electric switch assembly, designated generally at 170. A commercially available type of switch box 172 is fixed to the bottom cabinet wall 20 as by screws 174. A switch arm 176 extends from the box and the present invention includes a bracket 178, bolted at 180 to switch arms 176. Fixed, as by welding, to an upstanding arm of bracket 178 is a horizontally disposed U-shaped support member 182, the upper edge 184 of which is adapted to engage under a top shoulder of a cup 188. Cup 188 is disposed under the overflow drain tub 48 and the switch arm 176 is spring-loaded at 190 with an adjustment screw 192 to adjust said switch arm 176 to actuate a switch, designated 194 in FIG. 7, in box 172 after a predetermined amount of overflow water has been received in cup 188.

Figure 7:
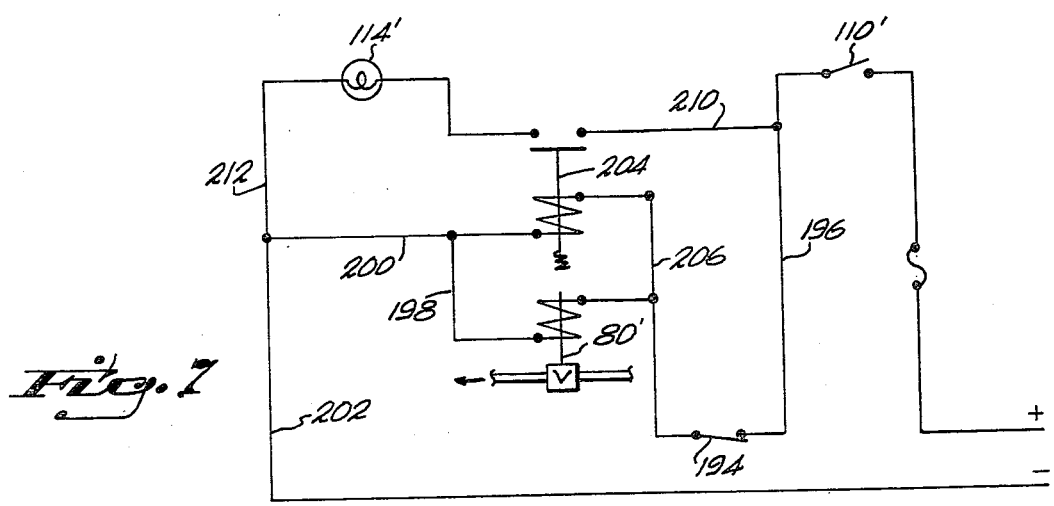
FIG. 7 is an electrical schematic of a second preferred form of the device.

With reference to FIG. 7, when the main on-off switch 110' is actuated to a closed position, a circuit is completed through an electric lead 196, normally closed switch 194, spring-loaded solenoid valve 80' and leads 198, 200 and 202 to cause water from a suitable pressurized source to flow into a jug 36 as described relative to FIG. 3. Solenoid switch 204 is simultaneously energized to the illustrated open position through leads 206 and 200. When cup 188 is filled with overflow water, as above described, switch 194 is opened permitting the closing of solenoid valve 80', and simultaneously permitting solenoid 204, which is also spring-loaded, to close and energize the signal light 114' through leads 196, 210, 212 and 202. Switch 110' is then opened if a replacement jug is not to be immediately filled with purified water.

As seen in FIG. 1, a suitable plug 214 is mounted in one side wall 16 of the housing for the reception of a mating plug of a suitable electrical conduit (not shown) for connection to a suitable power source. A storage compartment 216 is provided in a bottom portion of the housing 12.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A water purifying device comprising a main housing providing a first inner chamber portion, a receptacle in said first chamber portion, and a second inner chamber portion and a water filtering cartridge in said second chamber portion, a water intake conduit connecting between a pressurized water source and a first end of said cartridge, a water feed conduit having a first end connected to a second end of said cartridge and a second end connecting to said receptacle in a manner whereby said receptacle will overflow after being filled, means to direct said overflow into a collector means, electric circuit means connected to a power source, including a main on-off switch and an overflow limit switch associated with said collector means; a first solenoid operated valve connected between said electric circuit means and intake conduit in a manner whereby said valve will be opened to direct a flow of water from said pressurized water source through said intake conduit and said cartridge into said receptacle when said on-off switch is in an on position, said overflow limit switch being responsive to a predetermined collection of water in said collector means to stop the flow of water through said cartridge into said receptacle.

2. The device as defined in claim 1 including a first solenoid operated switch and a signal light connected in said electric circuit means in a manner whereby said solenoid operated switch will be actuated to energize said signal light to indicate a full condition of said receptacle when said predetermined amount of overflow has collected in said collector means.

3. The device as defined in claim 2 wherein said overflow limit switch is normally closed and comprises a weight operated switch including a removable cup, comprising said collector means carried on a switch arm thereof, and said means to direct said overflow includes a discharge tube opening into said cup, whereby the discharge of a predetermined amount of overflow water into said cup opens said overflow limit switch and stops the flow of water into said receptacle.

4. The device as defined in claim 1 including a two position relay in said electric circuit means, a first switch portion thereof being normally closed to complete a first circuit portion to open said first solenoid valve to fill said receptacle with water when said main on-off switch is in said on position.

5. The device as defined in claim 4 wherein said overflow limit switch is normally in an open position and including means to move said limit switch to a closed position in response to said predetermined collection of water in said collector means to simultaneously energize said relay to disengage said first switch portion thereof to stop said flow of water and to energize a second circuit portion through said relay, said second portion including a signal light to visually indicate said predetermined water collection in said collector means, and to engage a second switch portion to energize a third circuit portion.

6. The device as defined in claim 5 wherein said third circuit portion includes a manually controlled, normally open refill switch, a water pump extending into said collector means and a second solenoid valve connected between a drain means and said third circuit portion, whereby said second solenoid valve is opened and said water pump is energized to evacuate the water from said collector means through said drain means when said refill switch is closed.

7. The device as defined in claim 6 wherein said collector means comprises a housing with an inner chamber to collect said overflow water, and a float in said chamber, comprising said means to move, attached to said limit switch which is electrically connected to said water pump to energize same when the water rises to a predetermined level in said chamber.

8. The device as defined in claim 7 including a main drain conduit connecting from said cartridge second end for extension to a remote disposal area, and a manually controlled shut-off valve, interposed in said main drain conduit, including hand grip means for selective opening and closing of said valve.

9. The device as defined in claim 1 wherein said water feed conduit terminates at said second end in a cap having an inner diameter, said inner diameter being enlarged relative to an outside diameter of a top end open neck of said receptacle, said cap being disposed over said open neck.

10. The device as defined in claim 1 wherein said means to direct comprises a pan including peripheral upstanding side walls, disposed beneath said receptacle in a manner so as to catch said overflow, a support means for said pan, angled in a manner as to position one corner portion of said pan at a lower level than the balance thereof, and a drain tube communicating between said lower corner and said collector means.

11. The device as defined in claim 1 including a strainer fitting interposed in said water feed conduit.

* * * * *